United States Patent [19]

Miyake et al.

[11] 4,400,430
[45] Aug. 23, 1983

[54] MAGNET WIRES

[75] Inventors: Masayoshi Miyake; Isao Ueoka; Munetaka Kawaguchi, all of Nagoya, Japan

[73] Assignee: Sumitomo Electric Industries, Ltd., Osaka, Japan

[21] Appl. No.: 401,770

[22] Filed: Jul. 26, 1982

[30] Foreign Application Priority Data

Jul. 24, 1981 [JP] Japan .................................. 56-116549

[51] Int. Cl.$^3$ ............................................. B32B 27/00
[52] U.S. Cl. .................................... 428/383; 428/379; 174/110 N; 174/120 SR
[58] Field of Search ...................... 428/375, 379, 383; 110/110 N, 120 SR, 120 C

[56] References Cited

U.S. PATENT DOCUMENTS

| | | | |
|---|---|---|---|
| 3,446,660 | 5/1969 | Pendleton | 428/383 |
| 3,513,252 | 5/1970 | Schoerner | 174/110 SR X |
| 3,917,892 | 11/1975 | Kawaguchi et al. | 428/383 |
| 3,953,649 | 4/1976 | Suzuki et al. | 428/475.5 X |
| 4,239,635 | 12/1980 | Rieder | 252/51.5 A |
| 4,330,956 | 5/1982 | McCarthy | 428/383 X |
| 4,350,737 | 9/1982 | Saunders et al. | 174/110 N |

Primary Examiner—Lorraine T. Kendell
Attorney, Agent, or Firm—Sughrue, Mion, Zinn, Macpeak and Seas

[57] ABSTRACT

A magnet wire comprising a layer of baked enamel formed on the conductor either directly or through another insulation is disclosed. At least the outermost layer of the wire has an insulation coating formed by applying and baking an enamel composition consisting essentially of a polyamide at least one molecule of which is terminated with a straight alkyl group having 21 or more carbon atoms.

7 Claims, No Drawings

MAGNET WIRES

BACKGROUND OF THE INVENTION

The present invention relates to magnet wires having good self-lubricating properties.

Recently, manufacturers of electric apparatuses that use magnet wires have come to use high-speed automatic winding machines to increase the speed of the production line. The increased line speed at first seemed to cut the production cost by a substantial degree. However, it has now been found that the gains in production were more than offset by costs incurred as a result of damage caused to the wire and coating by friction and other mechanical stress during the high speed winding. If such damaged wire is assembled in an electric machine, layer shorting (short-circuiting between wires) occurs and the loss factor is increased to an undesirably high level.

To minimize the mechanical damage to the enamel coating, magnet wires having good self-lubricating properties have been demanded. Self-lubricating are necessary not only for use with an automatic winder but also because magnet wires are often inserted manually into a small slot in a motor. Since magnet wires themselves do not have good self-lubricating properties, the low slip factor between individual wires, between wires and the winder and between wires and the electrical machine into which they are assembled causes mechanical damage to the enamel coating or decreases the efficiency of the winding and assembling operations.

This problem has partly been solved by coating the magnet wire with a layer of various liquid lubricants such as liquid paraffin and refrigerator oil. But the resulting wires still do not have satisfactory lubricating and slip properties and cannot be handled efficiently in manual operation. Furthermore, such wires cannot be wound into a neat coil for making, e.g., a transformer, as the speed of the automatic winder has been increased further and the use of an inserter to achieve a higher space factor is more common these days.

Insufficient bonding of the magnet wires has become another factor which increases the chance of layer shorting. Improving the self-lubricating properties of magnet wires by applying a large quantity of liquid lubricants is not very effective. On the contrary, when this is done more dirt collects on the magnet wires and the bonding strength of adhesive tape used to fix the end of the coil is adversely affected. Attempts have been made to eliminate these defects by coating the magnet wires with solid lubricants such as solid paraffin and carnauba wax having better lubricating properties than liquid lubricants. To form a uniform coating on the magnet wires, the solid lubricants are usually applied to the wires from a solution having a few percent of the lubricant dissolved in solvents such as petroleum benzine, toluene and xylene. However, the use of a large quantity of low-boiling solvent is not only hazardous to human health but it also produces electric wires with creasing or crazing that do not have much commercial value. Therefore, coating with solid lubricants can only be applied to limited types of electric wires. Furthermore, if magnet wires coated with these solid lubricants are applied to motors that are to be immersed in refrigerants, the lubricant coating is extracted by the refrigerant and can clog the opening of the compressor valve or the refrigerant expansion nozzles in the refrigerator. This will reduce the refrigerating capacity of the machine. In addition, if the lubricant is extracted by the refrigerant, the self-lubricating properties of the magnet wire are reduced and the enamel coating becomes vulnerable to mechanical damage due to electromagnetic vibration.

Another method that has been proposed for providing magnet wires with high lubricating properties is to use enamel compositions containing synthetic resins having good lubricating properties such as polyethylene, polypropylene and polytetrafluoroethylene, as well as silicone oil, fluorine containing surfactants, and liquid and solid lubricants such as paraffin wax, carnauba wax and montan wax. However, synthetic resins such as polyethylene, polypropylene and polytetrafluoroethylene are sparingly soluble in solvents for the enamel and are difficult to disperse in the enamel uniformly, and the resulting enamel is not highly stable. What is more, these resins are not highly miscible with the insulating components of the enamel so they are difficult to disperse in the enamel coating uniformly and the resultant enamel coating does not have a good appearance. Liquid lubricants in the enamel provide an enamel coating whose slip and self-lubricating properties are as low as those of the coating formed by applying them onto the magnet wire. Solid lubricants in the enamel are sometimes extracted by refrigerants or solvents after the enamel is applied to the electric wire (the same thing happens when solid lubricants are directly applied to the magnet wire), and the magnet wire produced in this manner is not readily usable with motors that are to be immersed in refrigerants. Furthermore, like synthetic resins, the solid lubricants are sparingly soluble in solvents for making an enamel and they are not highly miscible with the insulating components of the enamel. Therefore, the resultant enamel is not stable and the lubricants are difficult to disperse in the enamel coating uniformly. Therefore, coatings produced in this manner do not have a good appearance.

SUMMARY OF THE INVENTION

The present inventors have carried out various studies to eliminate the above defects of conventional magnet wires. Accordingly, they have found that a desired magnet wire comprising a layer of baked enamel formed on the conductor either directly or through another insulation can be produced by applying to at least the outermost layer of the wire an enamel composition consisting essentially of a polyamide at least one molecule of which is terminated with a straight alkyl group having 21 or more carbon atoms, and baking the same. The magnet wire of the present invention itself has self-lubricating properties equal to those of the wire that has a layer of solid lubricants such as solid paraffin and carnauba wax, or those of the wire that is produced by coating the conductor with an enamel containing such solid lubricants or synthetic resins such as polyethylene and polypropylene having good lubricating properties.

In the magnet wire of the present invention, the enamel coating itself has high self-lubricating properties, and in this respect, it differs greatly from the conventional product wherein a lubricant is present on the surface of the magnet wire or within the enamel coating. What is more, the enamel coating of the wire of the present invention is not a simple blend of components, so the coating itself has great strength that withstands mechanical damage that might occur when a number of wires are inserted into the small slot of motors. Therefore, the magnet wire of the present invention has a better appearance than magnet wires having an enamel coating made from enamel compositions containing synthetic resins having good lubrication properties such as polyethylene and polypropylene. There is little chance that the enamel coating of the present invention will be extracted by refrigerants or solvents and clog the opening of the compressor valve or the refrigerant expansion nozzles in comparison with the enamel coating formed by applying solid lubricants such as solid paraffin or carnauba wax on the surface of the magnet wire or the coating formed from an enamel containing these solid lubricants. For these reasons, the magnet wire of the present invention can be applied advantageously to motors that are to be immersed in refrigerants and which hence are required to have high refrigerant resistance.

DETAILED DESCRIPTION OF THE INVENTION

The present invention is an enamel composition consisting essentially of a polyamide having at least one molecule which is terminated with a straight alkyl group having 21 or more carbon atoms. The composition is applied and baked to form at least the outermost layer of a magnet wire. This is necessary for achieving the object of the present invention which is the production of a magnet wire having good self-lubricating properties. The enamel composition used in the present invention is applied to the conductor either directly or through another insulation and baked. The resulting coating may be thin but it exhibits very good self-lubricating properties and is very strong with respect to thermal and mechanical damage. Therefore, it can be effectively used as a protective coating on another insulation having low self-lubricating properties. Insulation coatings that can be protected with the enamel coating of the present invention include every type of insulating material such as polyurethane, polyvinyl formal, polyester, polyester imide, polyhydantoin, polyamideimide, polyester amideimide, polyhydantoin ester or polyester amide. Since the magnet wire of the present invention may be used in motors to be immersed in refrigerants, insulating materials conventionally used to form refrigerant-resistant insulated wires are preferred, such as polyester, polyester imide and polyester amideimide.

The polyamide of the present invention includes at least one molecule of which is terminated with a straight alkyl group having 21 or more carbon atoms. The resin is a mixture of the following units (I), (II) and (III):

  (I)

  (II)

  (III)

wherein (PA) is a polyamide that makes up the polymer chain, and R is a straight alkyl group having 21 or more carbon atoms, with $n_1 + n_2 \geq 1$ wherein $n_1$ is the number of the molecules (I) and $n_2$ the number of the molecules (II).

In the present invention, the terminal straight alkyl group is preferably used in an amount of 0.3 to 3.5% by weight of the polyamide. If its amount is less than 0.3% by weight of the polymer, the desired lubricating properties are not obtained, and if its amount exceeds 3.5% by weight, the resulting enamel does not remain stable during storage and the electric wire coated with such enamel does not have the desired appearance or mechanical properties. With respect to the amount of the alkyl group, an amount in the range of from 0.3 to 2.5% by weight of the polymer is particularly preferred.

Therefore, for the purpose of the present invention, the factor K represented by the following equation is preferably from 0.3 (inclusive) to 3.5 (inclusive):

$$K = \frac{n_1 \times (R) + n_1 \times (R) + n_2 \times (R)}{n_1 \times [R\text{-}(PA)\text{-}R] + n_2 \times [R\text{-}(PA)\text{-}] + n_3 \times [\text{-}(PA)\text{-}]} \times 100$$

wherein $n_1$ and $n_2$ are the same as defined above; $n_3$ is the number of the molecules (III); the symbol "x" means multiplication; the symbols in parentheses indicate the formula weight of the parenthesized group or the molecular weight of the parenthesized molecule. More preferably, K is between 0.3 (inclusive) and 2.5 (inclusive).

The polyamide that makes up the polymer chain may be bonded to the terminal alkyl group in any fashion such as by an amido bond, imido bond, ester bond, urethane bond or urea bond. The straight alkyl group bonded to a terminal of the polyamide must have at least 21 carbon atoms to provide good lubricating properties, and the desired lubricating properties are not achieved if said alkyl group has less than 21 carbon atoms. Briefly stated, if the terminal of the polyamide is represented by $-(CH_2)_{n+1}CH_3$, n must be 21 or more. The alkyl group is preferably in a completely linear form, but it may be partially branched as long as the straight portion has at least 21 carbon atoms.

The polyamide that makes up the polymer chain in the present invention may be made of any material, such as nylon-6,6, nylon-6, nylon-6,10, nylon-6,12, nylon-11 and nylon-12, as well as copolymerized nylons produced by copolymerizing the monomer units of the above listed nylons. Nylon-6,6 and nylon-6 are preferred if the resulting polyamide is used as a protective layer. Copolymerized nylon containing a nylon-12 unit is preferred if the resultant polyamide is used as a self-bonding coat. Monomeric components used to produce the polyamide that makes up the polymer chain include lactams such as ϵ-caprolactam and ω-lauryllactam; polyvalent carboxylicacids such as adipic acid, sebacic acid, dodecanedicarboxylic acid and dimeric acid; polyamines such as tetramethylenediamine and hexamethylenediamine; and amino acids such as ϵ-aminocaproic acid and ω-aminododecanoic acid.

Examples of the compound that is used to introduce a straight alkyl group of 21 or more carbon atoms at a terminal of at least one molecule of the polyamide are aliphatic acids, alkyl esters and acid halides thereof, as well as higher alcohols and amines with aliphatic acids being preferred. Illustrative examples of aliphatic acids include docosanoic acid, tricosanoic acid, tetracosanoic acid, pentacosanoic acid, hexacosanoic acid, heptacosanoic acid, octacosanoic acid, nonacosanoic acid and triacantanoic acid, and derivatives of these aliphatic acids are esters and acid halides. Illustrative examples of higher alcohols include η-heneicosanol, η-docosanol, η-tetracosanol, η-hexacosanol, and η-octacosanol. Illustrative examples of amines include heneicosylamine, docosylamine, tricosylamine, pentacosylamine, hexacosylamine and octacosylamine. These compounds need not be used individually and may be used in admixture. For instance, Hoechst Wax S sold by Hoechst Japan, Ltd. that is based on montan wax acid (chain length: C 28-32) may be used.

One method for producing a polyamide at least one molecule of which is terminated with a straight alkyl group having 21 or more carbon atoms comprises polymerizing, e.g., by polyaddition, polycondensation or anionic polymerization, the monomeric component for the polyamide that makes up the polymer chain and a compound that has a functional group capable of reacting with said monomeric compound and which has a straight alkyl group of 21 or more carbon atoms. Another method comprises first polymerizing the monomeric component that makes up the polymer chain, then depolymerizing the polymer with a compound having a straight alkyl group of 21 or more carbon atoms. In the latter method, the reaction may be effected either in the presence or absence of a solvent.

Solvents preferred for making the enamel composition are those which contain a phenolic hydroxyl group such as phenol, o-cresol, m-cresol, p-cresol, 2,3-xylenol, 2,4-xylenol, 2,5-xylenol, 3,4-xylenol and 3,5-xylenol because the resulting polymer solution can be immediately used as enamel for making magnet wires. Insufficient reaction leaves in the solution the compound having a straight alkyl group of 21 or more carbon atoms. The unreacted compound is not only immiscible with the polyamide but is also only slightly soluble in the phenolic solvents, so the polymer solution obtained becomes heterogeneous and turbid and may sometimes gel, thus giving a magnet wire having unevenness in its self-lubricating properties and poor in appearance. To avoid these disadvantages, the reaction is preferably effected at the highest possible temperature for the longest period. The reaction temperature is preferably at least 150° C., more preferably at least 180° C. For shortening the reaction period, the reaction is most preferably effected at the reflux temperature of the reaction system.

Suitable solvents that can be used to control the viscosity of and concentration of the enamel are toluene, xylene, ethylbenzene, solvent naphtha and Cellosolve acetate.

The enamel composition according to the present invention which consists essentially of a polyamide resin at least one molecule of which is terminated with a straight alkyl group having 21 or more carbon atoms is either a polymer solution per se of the polyamide at least one molecule of which is terminated with a straight alkyl group having 21 or more carbon atoms, or such polymer solution that contains one or more additives such as other thermoplastic resins, thermosetting resins, fillers, pigments and dyes in an amount that does not impair the characteristics of said solution.

The present invention is now described in greater detail by reference to the following examples and comparative examples which are given here for illustrative purposes only and are by no means intended to limit its scope. In the examples and comparative examples, baking of enamel coated wires was carried out in a vertical furnace 9.5 m long at a temperature of 360° C. in the top, 320° C. in the middle and 260° C. in the bottom at a wire feed rate of 30 m/min. All characteristics except the coefficient of static friction of the magnet wires prepared were measured in accordance with JIS C 3003 and NEMA MW-1000. The coefficient of static friction was measured by the following method in terms of the coefficient of static friction between magnet wires; two parallel magnet wires were placed on a horizontal plane; a metal block to the bottom of which two parallel magnet wires were fastened was placed on said horizontal plane so that the respective pairs of wires crossed each other at a right angle; the metal block was moved along the two wires on the horizontal plane; and the minimum load necessary for moving the block was divided by the weight of the block to determine the coefficient of static friction of the wires.

In Reference Examples A to C, polyamide enamel compositions were prepared in a four-necked flask with a stirrer, a cooling tube and a thermometer. The flask was heated with a mantle heater.

REFERENCE EXAMPLE A

A mixture of 100 g of nylon-6,6 (CM 3001N produced by Toray Industries, Inc.), 1.5 g of palmitic acid and 400 g of m-cresol was charged in a 1000-ml flask, and under stirring, the mixture was slowly heated to 185° C. at which temperature it was subjected to reaction for 8 hours to prepare a polyamide enamel composition which was referred to as A-1. Polyamide enamel compositions A-2, A-3 and A-4 were prepared in the same manner except that palmitic acid was replaced by stearic acid, behenic acid and octacosanoic acid, respectively. As a control, enamel composition A-0 was prepared from only nylon-6,6 and m-cresol (no palmitic acid was used).

COMPARATIVE EXAMPLE 1

A commercial polyester enamel composition ("Briginol E-1080" from Dainichi Seika Color & Chemicals Mfg. Co., Ltd.) was applied to a copper wire (diameter: 0.5 mm) in five layers which were individually baked. Then, the outermost layer of the insulation was coated with a single layer of polyamide enamel A-0 which was baked to make a magnet wire. The characteristics of the wire are shown in Table 1.

COMPARATIVE EXAMPLES 2 AND 3 AND EXAMPLES 1 AND 2

Magnet wires were made as in Comparative Example 1 except that polyamide enamel A-0 was replaced by A-1, A-2, A-3 and A-4. The characteristics of the wires are shown in Table 1.

Table 1 indicates that the straight alkyl group must have at least 21 carbon atoms to provide good self-lubricating properties, with a carbon number of 27 or more being particularly preferred.

TABLE 1

|  | Polyamide Enamel | Carbon Number of Terminal Alkyl Group in Polyamide | Polyester Undercoat Thickness (mm) | Polyamide Topcoat Thickness (mm) | Appearance of Magnet Wire | Dielectric Breakdown Voltage | Repeated Scrape Resistance (times) | Coefficient of Static Friction |
|---|---|---|---|---|---|---|---|---|
| Comp. Ex. 1 | A-0 | 0 | 0.021 | 0.003 | good | 10.4 | 21.3 | 0.23 |

TABLE 1-continued

|  | Polyamide Enamel | Carbon Number of Terminal Alkyl Group in Polyamide | Polyester Undercoat Thickness (mm) | Polyamide Topcoat Thickness (mm) | Appearance of Magnet Wire | Dielectric Breakdown Voltage | Repeated Scrape Resistance (times) | Coefficient of Static Friction |
| --- | --- | --- | --- | --- | --- | --- | --- | --- |
| Comp. Ex. 2 | A-1 | 15 | 0.020 | 0.003 | good | 9.9 | 19.8 | 0.25 |
| Comp. Ex. 3 | A-2 | 17 | 0.0205 | 0.003 | good | 10.0 | 20.4 | 0.24 |
| Ex. 1 | A-3 | 21 | 0.022 | 0.003 | good | 9.8 | 22.4 | 0.15 |
| Ex. 2 | A-4 | 27 | 0.021 | 0.003 | good | 12.4 | 22.8 | 0.10 |

REFERENCE EXAMPLE B

A mixture of 100 g of nylon-6,6 (CM 3001N produced by Toray Industries, Inc.), 0.5 g of octacosanoic acid and 400 g of a mixed solvent of phenol and m-cresol (weight ratio=5:95) was charged in a 1,000 ml flask, and under stirring, the mixture was slowly heated to 180° C. at which temperature it was subjected to reaction for 6 hours to prepare a polyamide enamel composition which was fererried to as B-1. Polyamide enamel compositions B-2 and B-3 were prepared in the same manner except that octacosanoic acid was used in amounts of 1.6 and 3.0 g, respectively. As a control, enamel composition B-0 was prepared from only nylon-6,6 and phenol/m-cresol (no octacosanoic acid was used).

COMPARATIVE EXAMPLE 4

Polyamide enamel B-0 was applied to a copper wire (diameter: 0.5 mm) in five layers which were individually baked to make a magnet wire. The characteristics of the wire are shown in Table 2.

EXAMPLES 3 TO 5

Magnet wires were made as in Comparative Example 4 except that enamel B-0 was replaced by B-1, B-2 and B-3. The characteristics of the wires are shown in Table 2. Enamels B-1, B-2 and B-3 remained homogeneous and transparent even when they were left at room temperature for one month.

As is clear from Table 2, the magnet wires prepared in Examples 3 to 5 according to the present invention had much better self-lubricating properties than the conventional wire of Comparative Example 4.

hours to make a polyamide enamel composition which was referred to as CX-1.

Polyamide enamel CY-1 was prepared as above except that nylon-6,6 was replaced by 400 g of nylon-6 (CM-1001 produced by Toray Industries, Inc.).

Polyamide enamel CZ-1 was prepared as above except that nylon-6,6 was replaced by a mixture of 240 g of a copolymerized nylon-12-6 (weight ratio of nylon-12 unit to nylon-6 unit=8:2) having a reduced specific viscosity of 1.71 (as measured in 0.5% m-cresol solution at 30° C.) and 160 g of a copolymerized nylon-12-6-6,6 (weight proportions of nylon-12 unit, nylon-6 unit and nylon-6,6=1:1:1) having a reduced specific viscosity of 1.24.

Enamel compositions CX-1, CY-1 and CZ-1 remained homogeneous and transparent even when they were left at room temperature for one month.

A mixture of 100 g of nylon-6,6 (CM-3001N produced by Toray Industries, Inc.) and 400 g of m-cresol was charged in a 1,000 ml flask, and under stirring, the mixture was heated slowly to 180° C. over 6 hours to make a complete solution. The mixture was then cooled to 80° C. and 3 g of octacosanoic acid was added and the resulting mixture was stirred for 30 minutes to dissolve octacosanoic acid in the solution. The resulting homogeneous and transparent solution was referred to as a polyamide enamel composition CX-2. When it was cooled to room temperature, the insoluble matter precipitated and the solution turned opaque and heterogeneous. When it was left for one month, it turned more opaque and heterogeneous and was unsuitable as enamel.

A mixture of 400 g of nylon-6,6 (CM-3001N produced by Toray Industries, Inc.), 12 g of octacosanoic

TABLE 2

|  | Polyamide Enamel | Proportion of Straight-Chain Carboxylic Acid to Polyamide in Polymer Chain (wt %) | Appearance of Magnet Wire | Coat Thickness (mm) | Repeated Scrape Resistance (times) | Coefficient of Static Friction |
| --- | --- | --- | --- | --- | --- | --- |
| Comp. Ex. 4 | B-0 | 0 | good | 0.020 | 10 | 0.22 |
| Ex. 3 | B-1 | 0.5 | good | 0.021 | 13 | 0.11 |
| Ex. 4 | B-2 | 1.0 | good | 0.020 | 16 | 0.10 |
| Ex. 5 | B-3 | 3.0 | good | 0.019 | 6 | 0.08 |

REFERENCE EXAMPLE C

A mixture of 400 g of nylon-6,6 (CM-3001N produced by Toray Industries, Inc.), 6 g of Hoechst Wax S (montan wax acid from Hoechst Japan, Ltd.) and 1,600 g of a mixed solvent of m-cresol and p-cresol (weight ratio=7:3) was charged in a 3,000 ml flask, and under stirring, the mixture was slowly heated to 190° C. at which temperature it was subjected to reaction for 5 acid and 1,600 g of m-cresol was charged in a 3,000 ml flask, and under stirring, the mixture was slowly heated to 180° C. at which temperature it was subjected to reaction for 6 hours to make polyamide enamel CX-3. The enamel remained homogeneous and transparent even when it was left at room temperature for one month.

A mixture of 400 g of nylon-6,6 (CM-3001N produced by Toray Industries, Inc.) and 1,600 g of a mixed solvent of phenol and m-cresol (weight ratio=5:95) was charged in a 3,000 ml flask, and under stirring, the mixture was slowly heated to 180° C. where it was stirred for 2 hours to make a complete solution. The resulting polyamide enamel composition was referred to as CX-0.

Polyamide enamel CY-0 was prepared as above except that nylon-6,6 was replaced by 400 g of nylon-6 (CM-1001 produced by Toray Industries, Inc.).

Polyamide enamel CZ-0 was prepared in the same manner as CX-0 except that nylon-6,6 was replaced by a mixture of 240 g of copolymerized nylon-12-6 (weight ratio of nylon-12 unit to nylon-6 unit=8:2) having a reduced specific viscosity of 1.71 and 160 g of copolymerized nylon-12-6-6,6 (the weight proportions of nylon-12 unit, nylon-6 unit and nylon-6,6 unit=1:1:1) having a reduced specific viscosity of 1.24.

COMPARATIVE EXAMPLES 5 AND 6 AND EXAMPLES 6 AND 7

Magnet wires were made as in Comparative Example 1 except that CX-0, CX-2, CX-1 and CX-3 were used as polyamide enamel compositions, respectively, to prepare Comparative Examples 5 and 6 and Examples 6 and 7. The characteristics of the wires are shown in Table 3.

COMPARATIVE EXAMPLE 7

A commercial polyurethane enamel composition (TPU-F2 produced by Totoku Electric Paint Co., Ltd.) was applied to a copper wire (diameter: 0.5 mm) in five layers which were individually baked. Then, the outermost layer of the insulation was coated with a single layer of polyamide enamel CY-1 which was baked to make a magnet wire. The characteristics of the wire are shown in Table 4.

EXAMPLE 8

A magnet wire was made as in Comparative Example 7 except that polyamide enamel CY-0 was replaced by CY-1. The characteristics of the wire are shown in Table 4.

COMPARATIVE EXAMPLE 8

A commercial polyester imide enamel composition ("Isomid" produced by Nisshoku-Schenectady Co., Ltd.) was applied to a copper wire (diameter: 0.5 mm) in five layers which were baked individually to form an insulation coat 0.017 mm thick. Then, the outermost layer of the insulation was coated with three layers of polyamide enamel CZ-0 which were individually baked to form a self-bonding magnet wire with a polyamide coat 0.010 mm thick. The characteristics of the wire are shown in Table 5.

EXAMPLE 9

A self-bonding magnet wire was made as in Comparative Example 8 except that polyamide enamel CZ-0 was replaced by CZ-1. The characteristics of the wire are shown in Table 5.

The values of bond strength given in Table 5 were obtained as follows: an electric wire was closely wound around a mandrel (diameter: 5.0 mm) into a helical coil 70 mm long which was heated at 160° C. for 10 minutes under a load of 125 g, and the bond strength was determined according to ASTM D-2519.

TABLE 3

| | Polyamide Enamel | Appearance of Magnet Wire | Polyester Undercoat Thickness (mm) | Polyamide Topcoat Thickness (mm) | Dielectric Breakdown Voltage | | Extraction by Methanol (%) | Repeated Scrape Resistance (times) | Unidirectional Scrape Test (g) | Coefficient of Static Friction |
|---|---|---|---|---|---|---|---|---|---|---|
| | | | | | (kv) | After Aging at 200 C × 24 Hr | | | | |
| Comp. Ex. 5 | CX-0 | good | 0.023 | 0.003 | 10.7 | 10.3 | 0.23 | 30.0 | 1,103 | 0.24 |
| Ex. 6 | CX-1 | good | 0.022 | 0.003 | 11.3 | 11.6 | 0.18 | 36.9 | 1,019 | 0.09 |
| Comp. Ex. 6 | CX-2 | poor | 0.022 | 0.0025 | 9.5 | 8.8 | | 22.8 | 936 | 0.12 |
| Ex. 7 | CX-3 | good | 0.023 | 0.002 | 11.5 | 12.0 | 0.21 | 26.3 | 1,138 | 0.07 |

TABLE 4

| | Polyamide Enamel | Appearance of Magnet Wire | Polyurethane Undercoat Thickness (mm) | Polyamide Topcoat Thickness (mm) | Coefficient of Static Friction |
|---|---|---|---|---|---|
| Comp. Ex. 7 | CY-0 | good | 0.024 | 0.003 | 0.18 |
| Ex. 8 | CY-1 | good | 0.023 | 0.0035 | 0.06 |

TABLE 5

| | Polyamide Enamel | Appearance of Magnet Wire | Bond Strength At R.T. (kg) | Bond Strength At 130° C. (g) | Coefficient of Static Friction |
|---|---|---|---|---|---|
| Comp. Ex. 8 | CZ-0 | good | 4.6 | 580 | 0.19 |
| Ex. 9 | CZ-1 | good | 4.5 | 550 | 0.08 |

As Tables 3 to 5 show, the magnet wires of the present invention had very good self-lubricating properties without substantially sacrificing other characteristics.

COMPARATIVE EXAMPLE 9

A mixture of 400 g of nylon-6,6 (CM-3001N produced by Toray Industries, Inc.), 4 g of octacosanoic acid and 1,600 g of m-cresol was charged in a 3,000 ml flask, and under stirring, the mixture was heated slowly to 150° C. at which temperature it was subjected to reaction for 3 hours. The resulting polyamide enamel was applied to a copper wire (diameter: 0.5 mm) in seven layers which were individually baked to make a magnet wire. The wire did not have good appearance and its coefficient of static friction was 0.14. When the polyamide enamel was left at room temperature, the insoluble matter precipitated in one day, and the enamel turned opaque and heterogeneous in one month.

EXAMPLE 10

Polyamide enamel was prepared as in Comparative Example 9 except that the reaction period was extended to 10 hours. The enamel was applied to a copper wire and a magnet wire was made as in Comparative Example 9. The wire had good appearance and its coefficient of static friction was 0.10.

As will be apparent from the results shown in Tables 1 to 5, the magnet wires of the present invention had much lower coefficient of static friction and thus better self-lubricating properties than the conventional products.

Further, it can be seen that the magnet wires of the present invention were substantially equivalent to the conventional magnet wires with respect other properties and hence were proved to have a great potential for industrial use.

While the invention has been described in detail and with reference to specific embodiments thereof, it will be apparent to one skilled in the art that various changes and modifications can be made therein without departing from the spirit and scope thereof.

What is claimed is:

1. A magnet wire, comprising:
an electrical conductor core; and
at least one outermost insulation layer surrounding the core, the layer being formed by applying and baking an enamel composition consisting essentially of a polyamide polymer at least one molecule of which is terminated with a straight chain alkyl group having 21 or more carbon atoms, the straight chain alkyl group being contained in the polyamide in an amount of 0.3 to 3.5% by weight.

2. A magnet wire as claimed in claim 1, wherein the electrical conductor is in direct contact with an inner insulation layer, the inner insulation layer being in direct contact with and being surrounded by the outermost insulation layer.

3. A magnet wire as claimed in claim 1 or 2, wherein the straight chain alkyl group is contained in the polyamide in an amount of 0.3 to 2.5% by weight.

4. A magnet wire as claimed in claim 1 or 2, wherein the polyamide is nylon-6,6.

5. A magnet wire as claimed in claim 1 or 2, wherein the polyamide is nylon-6.

6. A magnet wire as claimed in claim 1 or 2, wherein the polyamide is a copolymerized nylon including a nylon-12 unit.

7. A magnet wire as claimed in claim 1 or 2, wherein the polyamide is terminated with a straight alkyl group having 27 or more carbon atoms, said enamel being a polymer solution produced by reacting a polyamide with a carboxylic acid having a straight alkyl group of 27 or more carbon atoms in a phenolic solvent under heating.

* * * * *